US000001292H

United States Statutory Invention Registration [19]

[11] Reg. Number: H1292

Marsh

[43] Published: Mar. 1, 1994

[54] ELECTRO-RHEOLOGICAL FLUID DAMPED ACTUATOR

[75] Inventor: Ronald A. Marsh, Fargo, N. Dak.

[73] Assignee: The United States of America as represented by the Secretary of the Navy, Washington, D.C.

[21] Appl. No.: 950,581

[22] Filed: Sep. 23, 1992

[51] Int. Cl.[5] ..... F15B 13/16; F15B 21/04

[52] U.S. Cl. ..... 60/326; 60/368; 60/911; 91/361

[58] Field of Search ..... 60/326, 368, 911; 91/4 R, 361

[56] References Cited

U.S. PATENT DOCUMENTS

| | | | |
|---|---|---|---|
| 3,521,535 | 7/1970 | Oelrich | 91/361 |
| 3,542,274 | 11/1970 | Miller | 60/368 |
| 3,599,428 | 8/1971 | Chaney et al. | 60/326 |
| 4,386,553 | 6/1983 | Thoman et al. | 91/361 |
| 4,528,894 | 7/1985 | Crosby | 91/361 |
| 4,840,112 | 6/1989 | Bhadra et al. | 60/326 |
| 5,042,253 | 8/1991 | Kataoka | 91/4 R |

*Primary Examiner*—David H. Brown

*Attorney, Agent, or Firm*—Robert J. Hampsch; Melvin J. Sliwka; John L. Forrest, Jr.

[57] ABSTRACT

An electro-rheological fluid damped actuator having an actuator housing with a moveable element such as a piston and rod assembly disposed within the housing. The actuator further comprises a hydraulic circuit with an electro-rheological fluid disposed in the hydraulic circuit. The hydraulic circuit and rheological fluid provides an active and variable damping force on the moveable element. The damping force is controlled by the output of an electrical circuit which creates an electric field within the hydraulic circuit. The electric field will cause the viscosity of the electro-rheological fluid which is exposed to the electric field to increase or decrease in accordance with the magnitude of the electric field. The increase in viscosity of the electro-rheological fluid as it flows through the actuator provides an active damping force on the actuator which allows a more precise control of the output motions of the actuator.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRO-RHEOLOGICAL FLUID DAMPED ACTUATOR

BACKGROUND OF THE INVENTION

The present invention relates to the field of hydraulic dampers for actuator mechanisms and more particularly to a hydraulic damper with electro-rheological fluid which can vary the degree of dampening for the actuator mechanism.

The high rates of speed and reduced flight times of various missile systems often require that airframe responses to command controls be swift, accurate, and sustainable. Many missile systems use pneumatic, hydraulic, or electro-mechanical actuators for aerofin and thrust vector control.

Actuator mechanisms typically use a pressurized gas or fluid to drive moveable element such as a piston or set of pistons which in turn, rotate or move a control surface. These conventional actuator mechanisms have historically demonstrated several undesirable characteristics. Due to the compressibility of the gas or fluid medium the control surface may tend to flutter. Also, a common anomaly is the lack of precision of the actuator mechanisms in that the control surface may not move to the exactly to the commanded position.

Electro-pneumatic actuation mechanisms powered by compressed gases posses the advantages of being fast acting, clean, light weight, and relatively inexpensive to install, operate and maintain. A major drawback of purely pneumatic actuation mechanisms is the fact that the output motions cannot be precisely controlled. This is due primarily due to the tendency of the gases to demonstrate a large magnitude of compression and subsequent expansion. Pneumatic actuators do not possess the stiffness, speed and positioning accuracy necessary for many missile and rocket applications.

Electro-hydraulic actuation mechanisms can be more precisely controlled due to the relative incompressibility of the hydraulic fluid as compared to pneumatic gases. Active hydraulic actuation mechanisms, however, require various pumps and pump motors which introduce unwanted noise, vibration in addition to reliability concerns. Hydraulic actuation mechanisms tend to be somewhat expensive to install and maintain. The circuitry for conducting hydraulic fluid to and from the pump and associated components often poses operational and logistical constraints when used in confined spaces such as missile airframes. The hydraulic actuation mechanisms also include various fittings which introduce potential leakage paths for the hydraulic fluids operating under high pressures.

Hybrid hydro-pneumatic drive mechanisms are also used. These hydro-pneumatic drive mechanisms typically seize the advantages of purely electro-pneumatic drive mechanisms as well as the advantages of purely electro-hydraulic drive mechanisms. Such hybrid mechanisms generally employ an active pneumatic mechanism with a passive or pumpless hydraulic mechanism and are connected in such a manner that the movement imparted to the drive member by the pneumatic drive mechanism also produces a flow of fluid within the hydraulic mechanism. The restriction of this fluid flow further acts to control the drive member.

Such hydraulic dampening occurs when the motion of a piston causes fluid to flow through a restriction or orifice. The force required to move the piston at a given rate is proportional to the degree to which the fluid is restricted. Common methods to vary the restriction of the fluid are with the use spool valves and solenoid valves. Spool valves generally have smooth, continuously variable restriction but cannot provide complete restriction due to the tolerances necessary to allow the spool to slide. Solenoid valves, on the other hand, usually provide a few discrete restriction positions which correspond to discrete plunger positions. Solenoid valves can also provide complete restriction in at least one flow direction.

A drawback of the use of these current passive damping techniques is that a tradeoff must be made between actuator speed, and actuator stiffness. The term stiffness refers to the ability of an actuator to respond to and maintain command positions despite external disturbances such as the presence of vibrations and wind turbulence. Damping techniques are often used to influence actuator stiffness. Actuator stiffness increases with dampening while actuator speed often decreases with damping.

SUMMARY OF THE INVENTION

The present invention provides an improved hydraulic damped actuator possessing the previously noted attributes and capabilities. Specifically, the present invention is an electro-rheological fluid damped actuator having an actuator housing with a moveable element such as a piston and rod assembly disposed within the housing. Preferably, the actuator is a pneumatic actuator where the moveable element or piston and rod assembly moves under the force of a pressurized gas. The actuator further comprises a hydraulic circuit with an electro-rheological fluid disposed in the hydraulic circuit. The hydraulic circuit and rheological fluid provides an active and variable damping force on the moveable element. The damping force is controlled by the output of an electrical circuit which creates an electric field within the hydraulic circuit. The electric field will cause the viscosity of the electro-rheological fluid which is exposed to the electric field to increase or decrease in accordance with the magnitude of the electric field. The increase in viscosity of the electro-rheological fluid as it flows through the actuator provides an active damping force on the actuator which allows a more precise control of the output motions of the actuator.

In addition, the present invention preferably includes a position sensor which generates a signal corresponding to the position of a control surface which is controlled by the actuator. This signal is then used as an input signal to the aforementioned electrical circuit. Another input signal to the electrical circuit is a signal which corresponds to the position to which the actuator was commanded. The preferred electrical circuit takes those two input signals and produces a corresponding output signal which produces the effective amount of damping for the actuator relative to the relation between the commanded position of the actuator and the actual position of the actuator.

The preferred embodiment of the present invention also utilizes a hydraulic control valve which is situated in the hydraulic circuit. The electro-rheological fluid valve provides for a point of restriction in the hydraulic circuit. The output of the electric circuit creates an electric field proximate this electro-rheological fluid valve such that the viscosity of the electro-rheological fluid in the electro-rheological fluid valve is varied commensurate with the magnitude of said electric field. The configuration of the electro-rheological fluid valve and electro-rheological fluid is such that the fluid flow through the valve is reduced and possibly stopped. The total restriction of the fluid flow acts to hold the actuator in place. Partial restriction of the fluid flow yields the variable damping effects.

Accordingly, the general object of this invention is to provide an improved variable fluid damped actuator.

Another object of this invention is to provide an improved method of variably damping an actuator which is capable of continuously varying flow restriction and completely restricting the flow.

A still further object of this invention is to provide a variable fluid damped actuator which provides an active damping force on the actuator which improves the accuracy of the actuator by allowing a more precise control of the actuator output motions.

Yet another object of this invention is to provide a variable fluid damped actuator which has a high reliability, is simple in design, and simple to control.

A feature of this invention is the capability of the actuator to produce an effective amount of damping for the actuator. The effective amount of damping is dependent on the relation between the commanded position of the actuator and the actual position of the actuator.

An advantage of the present invention is the ability of the actuator to maintain a relatively high degree of actuator stiffness without compromising or decreasing the actuator speed.

DETAILED DESCRIPTION

Figure 1:
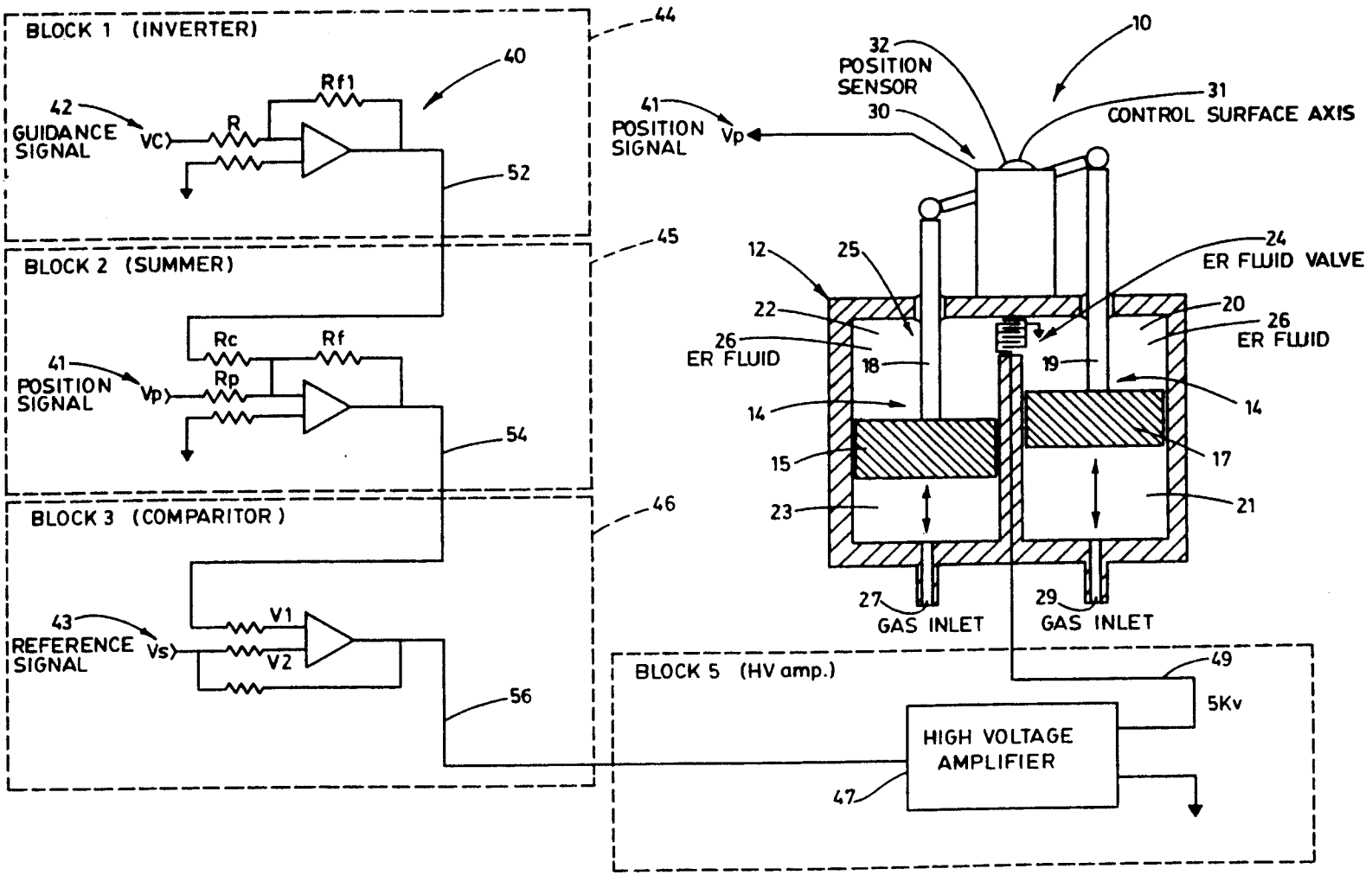
FIG. 1 is a cross section view of an embodiment of the present invention together with a schematic of an associated electrical circuit.

The preferred embodiment of the electro-rheological fluid damped actuator (10) is shown in FIG. 1. This preferred embodiment comprises a housing (12) having a plurality of interior chambers (20,21,22,23). Also inside the housing (12) is a piston and rod assembly (14) which further defines the chambers (20,21,22,23). The two uppermost chambers (20,22) are connected by means of an electro-rheological fluid valve (24). These two chambers (20,22) together with the electro-rheological fluid valve (24) comprise a hydraulic circuit (25). This hydraulic circuit (25) is filled with an electro-rheological fluid (26). The composition and structural configuration of electro-rheological fluids and electro-rheological fluid valves are commonly known to those skilled in the art of rheological technology.

The remaining chambers in the housing (12) are reserved as pneumatic chambers (21,23). Pneumatic inlet valves (27,29) are located proximate these pneumatic chambers (21,23). A pneumatic source (not shown) is introduced through the pneumatic inlet valves (27,29) when the actuator (10) is commanded to a position. The pneumatic source initiates the movement of the electro-rheological fluid damped actuator (10).

The piston and rod assembly (14) actually comprises two pistons (15,17) each disposed between separate interior chambers (21,21,22,23) within the housing (12). There are also a plurality of connected rods (18,19) attached from the pistons (15,17) to a control surface (30). The rods (18,19) transfer the movement of the pistons (15,17) into a corresponding movement of the control surface (30).

The movement of the control surface (30) can be described with respect to a control surface axis (31). A position sensor (32) is attached to the control surface (30). This position sensor (32) detects the relative movement of the control surface (30) with respect to the control surface axis (31). The position sensor (32) generates an actual position signal (41) corresponding to the actual movement of the control surface (30).

This actual position signal (41) is forwarded to an electrical circuit (40) which is operatively connected to the electro-rheological fluid damped actuator (10). The electrical circuit (40) comprises several discrete functional circuits connected in series with one another. These discrete functional circuits include an inverter circuit (44) which is connected in series to a summer circuit (45) which is further connected in series to a comparitor circuit (46). The signal produced by the comparitor circuit (46) is forwarded to a high voltage amplifier (47) which is directly connected to the electro-rheological fluid valve (24) .

The actual position signal (41) represents one of the inputs to the electrical circuit (40). Another input to the electrical circuit (40) is the commanded position signal (42) which corresponds to the position to which the actuator (10) and control surface (30) was commanded. Yet another input signal is the reference signal (43) which is used by the comparitor circuit (46). There also exist several discrete signals which are internal to the electrical circuit (40) and passed between the functional circuits. This internal signals are discussed in more detail below.

The output signal of the electrical circuit (40) is a high voltage and low current signal (49) which is passed on to the electro-rheological fluid valve (24). When the high voltage output signal (49) is applied across the electro-rheological fluid valve (24), the electro-rheological fluid (26) passing through the electro-rheological fluid valve (24) encounters an electric field. The viscosity of the electro-rheological fluid (26) in the electro-rheological fluid valve (24) will increase. The viscosity of said electro-rheological fluid (26) exposed to said electric field is varied in accordance with the magnitude of said electric field.

The preferred embodiment of the electro-rheological fluid damped actuator (10) incorporates current rheology technology, which allows the use of active damping to enhance the speed and stiffness of the actuator (10). The chemical and physical composition of the active electro-rheological fluid (26) in the preferred embodiment allows changes in effective friction to take place as the fluid flows through the actuator (10). When the moveable element in the actuator (10) is required to move the control surface (30) a large distance to get to the commanded position, the electro-rheological fluid (26) maintains a lower viscosity and therefore contributes less resistance to the actuator (10) movement. This allows a rapid movement of the control surface (30) to the commanded position. On the other hand, when the control surface (30) is nearly in the correct commanded position, the electric circuit (40) creates an electric field in the electro-rheological fluid valve (24). This in turn increases the viscosity of the electro-rheological fluid (26) which acts to stiffen the actuator (10) and maintain position. A stiffer actuator (10) is also less likely to respond to external disturbances such as wind or vibrations. Further, electro-rheological fluids (26) have a typical response time or solidification time in the range of a few milliseconds. The operation of the preferred embodiment of the electro-rheological fluid damped actuator (10) is set forth in the following paragraphs.

A commanded position signal (42) is generated and sent to the actuator (10). Upon receipt of the commanded position signal (42) the actuator (10) processes the signal and further sends the commanded position signal (42) to an inverter circuit (44). As the actuator (10) begins to move to the commanded position, a control surface (30) which is operatively connected to the actuator (10) also moves. As the control surface (30) moves, an actual position signal (41) is generated by a position sensor (32). The actual position signal (41) corresponds to the position of a control surface (30) with respect to the control surface axis (31). This actual position signal (41) is forwarded to a summer circuit (45).

Concurrently with the movement of the actuator (10) and the control surface (30), the inverter circuit (44) reverses the sign of the commanded position signal (42). The reversed commanded position signal (52) is also forwarded to the summer circuit (45). The summer circuit (45) receives the reversed commanded position signal (52), scales the reversed commanded position signal (52) as required, and adds the scaled reversed command signal (52) with the actual position signal (41). As the actuator (10) approaches the commanded position, the summation of the reversed commanded position signal (52) and the actual position signal (41) approaches zero. The resulting signal (54) from the summer circuit (45) is then sent to the comparitor circuit (46).

The comparitor circuit (46) compares the resulting signal (54) from the summer circuit (45) to a reference signal (43) to determine if the actuator (10) and control surface (30) have moved to the commanded positions. When the actuator (10) and control surface (30) have moved to the commanded positions the comparitor circuit (46) will send a signal (56) to a high voltage amplifier (47). The high voltage amplifier (47) in turn sends a high voltage output signal (49) to the electro-rheological fluid valve (24). The preferred high voltage output signal (49) is approximately 5Kv.

When the high voltage output signal (49) is applied across the electro-rheological fluid valve (24), the electro-rheological fluid (26) passing through the electro-rheological fluid valve (24) encounters an electric field. The viscosity of the electro-rheological fluid (26) in the electro-rheological fluid valve (24) will increase. This viscosity increase reduces if not stops the fluid flow through the electro-rheological fluid valve (24). Reducing or stopping the fluid flow through the electro-rheological fluid valve (24) provides a damping force on the actuator (10) and holds the actuator (10) in place. When a new position command signal is initiated, the above identified process starts over.

The use of electro-rheological fluids (26) in conjunction with a electro-rheological fluid valve (24) reduces the problems associated with the flutter of an actuator (10) and increases the precision of pneumatic actuator movements significantly. Also since electro-rheological fluids (26) have a relatively high frequency response, the accuracy of actuators (10) are also increased.

While specific embodiments of the integral pressure sensor have been shown and described, many variations are possible. Features such as additional of different external electronic circuits or additional processors may be employed. The particular construction and configuration of the electro-rheological fluid and moveable element, the type of position sensors used, and the configuration of the actuator housing all may be changed to suit the system or application with which the actuator is used.

Alternatives to the preferred design are numerous. The teachings of the preferred embodiment can be applied to rotary, hydraulic and possibly electro-mechanical actuators. The electrical circuits illustrated and described are only representative of the many different electrical circuits and designs that may be employed with the electro-rheological fluid damped actuator (10).

Having described the invention in detail, those skilled in the art will appreciate that modifications may be made to the invention without departing from its spirit. Therefore, it is not intended that the scope of the invention be limited to the specific embodiment illustrated and described. Rather, R is intended that the scope of this invention be determined by the appended claims and their equivalents.

What we claim as the invention is:

1. An electro-rheological fluid damped actuator comprising:

a housing defining at least two chambers;

a moveable element disposed in each of said chambers further isolating and defining separate hydraulic chambers and pneumatic chambers;

a plurality of pneumatic inlet valves in communication with said pneumatic chambers and further adapted for accepting a supply of pressurized gases for moving said moveable element to a commanded position;

an electro-rheological fluid disposed in said hydraulic chambers;

an electro-rheological fluid valve disposed between the hydraulic chambers and in communication therewith, said electro-rheological fluid valve adapted for restricting the flow between said hydraulic chambers, said electro-rheological fluid valve in combination with said electro-rheological fluid provides an active and variable damping force on said moveable element; and an electrical circuit an output of which creates an electric field within said electro-rheological fluid valve such that said electro-rheological fluid passing through said fluid control valve encounters said electric field whereby the viscosity of said electro-rheological fluid exposed to said electric field is varied in accordance with the magnitude of said electric field.

2. The electro-rheological fluid damped actuator of claim 1 wherein said moveable element is a piston and rod assembly.

3. The electro-rheological fluid damped actuator of claim 1 wherein said actuator further comprises a position sensor which generates a signal corresponding to the position of a control surface with respect to a control surface axis, said control surface operatively controlled by said actuator.

4. The electro-rheological fluid damped actuator of claim 3 wherein said electrical circuit further comprises:

an inverter circuit having an position command signal corresponding to a commanded position of said actuator as input to said inverter circuit, said inverter circuit further reversing a sign of said position command signal thereby producing a reversed position command signal as an output;

a summer circuit adapted for receiving said reversed command signal as an input, said summer circuit adapted for scaling said reversed command signal and adding said scaled reversed command signal with said actual position signal to produce a summer circuit signal;

a comparitor circuit adapted for receiving said summer circuit signal and comparing said summer circuit signal resulting to a reference signal to determine if said actuator has moved to said commanded position, said comparitor circuit further adapted to forward a comparitor circuit signal as an output; and an amplifier adapted for receiving said comparitor circuit signal and forwarding a high voltage output signal to said electro-rheological fluid valve.

5. An electro-rheological fluid damped actuator for controlling the orientation and displacement of a control surface with respect to a control surface axis, said actuator comprising:

a cylindrical housing defining at least two interior chambers;

a piston and rod assembly movably disposed in said interior chambers further isolating and defining separate hydraulic chambers and pneumatic chambers, said piston and rod assembly further operatively connected to said control surface such that any movement of said piston and rod assembly causes a corresponding movement of said control surface to a commanded position with respect to said control surface axis;

a plurality of pneumatic inlet valves in communication with said pneumatic chambers and further adapted for accepting a supply of pressurized gases for moving said piston and rod assembly to a predetermined position;

a position sensor which generates a signal corresponding to the position of said control surface with respect to said control surface axis;

a electro-rheological fluid valve disposed between the hydraulic chambers and in communication therewith, said electro-rheological fluid valve adapted for restricting the flow between said hydraulic chambers;

an electro-rheological fluid disposed in said hydraulic chambers and in said electro-rheological fluid valve, said electro-rheological fluid flow further provides an active and variable damping force on said piston and rod assembly; and an electrical circuit having a plurality of input signals and an output signal, said input signals include said position sensor signal and another signal corresponding to said commanded position to which said actuator is commanded, said output signal creates an electric field proximate said electro-rheological fluid valve whereby the viscosity of said electro-rheological fluid exposed to said electric field is varied in accordance with the magnitude of said electric field.

6. The electro-rheological fluid damped actuator of claim 5 wherein said electrical circuit further comprises:

an inverter circuit having an position command signal corresponding to a commanded position of said actuator as input to said inverter circuit, said inverter circuit further reversing a sign of said position command signal thereby producing a reversed position command signal as an output;

a summer circuit adapted for receiving said reversed command signal as an input, said summer circuit adapted for scaling said reversed command signal and adding said scaled reversed command signal with said actual position signal to produce a summer circuit signal;

a comparitor circuit adapted for receiving said summer circuit signal and comparing said summer circuit signal resulting to a reference signal to determine if said actuator has moved to said commanded position, said comparitor circuit further adapted to forward a comparitor circuit signal as an output; and an amplifier adapted for receiving said comparitor circuit signal and forwarding a high voltage output signal to said electro-rheological fluid valve.

7. A method for damping an actuator, said actuator comprising a cylindrical housing defining at least two interior chambers and further having moveable elements disposed in each said chamber further isolating and defining separate hydraulic chambers and pneumatic chambers, the movement of said moveable elements in response to pneumatic forces controls the orientation and displacement of a control surface with respect to a control surface axis, and method of damping comprising the steps of:

placing a position sensor proximate said control surface which generates a signal corresponding to a position of said control surface with respect to said control surface axis;

inserting a electro-rheological fluid valve between the hydraulic chambers and in communication therewith, said electro-rheological fluid valve adapted for restricting the flow between said hydraulic chambers;

filling said hydraulic chambers and said electro-rheological fluid valve with an electro-rheological fluid whereby said electro-rheological fluid flow provides an active and variable damping force on said moveable elements; and connecting an electrical circuit having a plurality of input signals and an output signal to said electro-rheological fluid valve, said input signals include said position sensor signal and another signal corresponding to a position to which said actuator is commanded, said output signal creates an electric field proximate said electro-rheological fluid valve whereby the viscosity of said electro-rheological fluid exposed to said electric field is varied in accordance with a magnitude of said electric field, which in turn restricts and hydraulic flow through said electro-rheological fluid valve to achieve a damping effect.

* * * * *